(No Model.)

R. H. WINGATE.
SCRAPER ATTACHMENT TO PLOWS.

No. 247,977. Patented Oct. 4, 1881.

Witnesses.
W. W. Mortimer,
A. C. Kiskadden

Inventor:
R. H. Wingate,
per
F. A. Lehmann,
Atty.

N. PETERS, Photo-Lithographer, Washington, D. C.

UNITED STATES PATENT OFFICE.

ROBERT H. WINGATE, OF CHAPEL HILL, MISSISSIPPI.

SCRAPER ATTACHMENT TO PLOWS.

SPECIFICATION forming part of Letters Patent No. 247,977, dated October 4, 1881.

Application filed July 25, 1881. (No model.)

*To all whom it may concern:*

Be it known that I, ROBERT H. WINGATE, of Chapel Hill, in the county of Hinds and State of Mississippi, have invented certain new and useful Improvements in Scraper Attachments to Plows; and I do hereby declare the following to be a full, clear, and exact description of the invention, such as will enable others skilled in the art to which it pertains to make and use it, reference being had to the accompanying drawings, which form a part of this specification.

My invention relates to an improvement in scraper attachments for plows; and it consists in clamping the rear end of the horizontal shank rigidly to the plow-standard and fastening the shank just back of the scraper into any desired position by means of a screw-rod, and then bracing the scraper by a rod or brace, which is fastened to the scraper near its front corner, and to the under side of the beam, near its front end, as will be more fully described hereinafter.

The object of my invention is to attach a scraper to plows, so that it will run along just in advance of the plow-point, for the purpose of scraping or cutting away the weeds and trash which may be in the way of the plow, and bracing this scraper in such a manner as to prevent all possibility of its being displaced while in operation.

Figure 1:
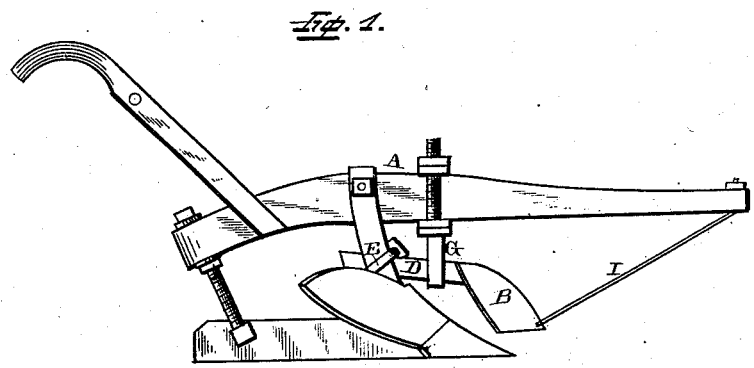
Figure 2:
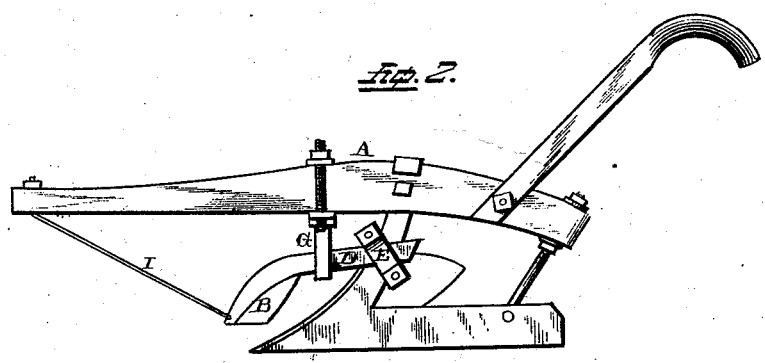

Figures 1 and 2 are side elevations of my invention, taken from opposite sides.

A represents a plow of any suitable construction, and to which my scraper B is attached. The blade of this scraper is preferably made of the form here shown, and extends forward in advance of the point of the plow so as to cut away the weeds, dirt, and trash which would have a tendency to clog the plow as it is drawn forward. This scraper has a shank, D, which extends horizontally, or nearly so, backward, and which has its rear end clamped to the side of the standard by means of the clamp E. Passed over this shank is the head G of a vertical screw, which passes upward through suitable supporting devices, which are secured to the beam, and which screw serves the purpose of adjusting the front end of the scraper either up or down, as circumstances may require.

In order to prevent this scraper from being forced backward or displaced in any manner an iron rod or brace, I, of any suitable kind is fastened to the outer edge of the scraper at any suitable distance above its point, and the front end of the rod extends forward and is passed into the under side of the beam at any suitable distance from its front end. As the point of this scraper is not intended to run in the ground this brace-rod will not be in the way in any manner. This screw being braced or held in position at three different points, it will readily be seen that it can be securely held wherever it may be adjusted.

Having thus described my invention, I claim—

The combination of a plow with a scraper having its shank extending backward and secured in position by means of a clamp to the standard, and fastened to the beam by means of an adjusting-screw and a brace-rod, substantially as shown and described.

In testimony whereof I affix my signature in presence of two witnesses.

ROBERT H. WINGATE.

Witnesses:
   T. McCLELEND,
   WILLIAM D. FARMER.